United States Patent
Arya et al.

(10) Patent No.: US 9,536,198 B2
(45) Date of Patent: Jan. 3, 2017

(54) NON-TECHNICAL LOSS DETECTION AND LOCALIZATION

(71) Applicant: International Business Machines Corporation, Armonk, NY (US)

(72) Inventors: Vijay Arya, Bangalore (IN); Kaushik Das, Roskilde (DK); Jagabondhu Hazra, Bangalore (IN); Shivkumar Kalyanaraman, Bangalore (IN); Balakrishnan Narayanaswamy, Bangalore (IN); Devasenapathi P. Seetharamakrish, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/087,788

(22) Filed: Nov. 22, 2013

(65) Prior Publication Data

US 2015/0149396 A1 May 28, 2015

(51) Int. Cl.
*G06N 7/00* (2006.01)
*G06N 5/04* (2006.01)

(52) U.S. Cl.
CPC .. *G06N 5/04* (2013.01); *G06N 7/00* (2013.01)

(58) Field of Classification Search
None
See application file for complete search history.

(56) References Cited

U.S. PATENT DOCUMENTS

| | | | |
|---|---|---|---|
| 5,168,170 A | 12/1992 | Hartig | |
| 7,795,877 B2 | 9/2010 | Radtke et al. | |
| 7,936,163 B2 | 5/2011 | Lee, Jr. | |
| 7,979,239 B2 * | 7/2011 | Trias | H02J 3/00 700/286 |
| 8,000,913 B2 | 8/2011 | Kreiss et al. | |
| 2008/0109387 A1 | 5/2008 | Deaver et al. | |
| 2010/0007336 A1 | 1/2010 | de Buda | |
| 2010/0231413 A1 | 9/2010 | Conant et al. | |

FOREIGN PATENT DOCUMENTS

| | | |
|---|---|---|
| EP | 2439496 A1 | 11/2012 |
| KR | 1020120050320 A | 5/2012 |
| WO | 2008057808 A2 | 5/2008 |

(Continued)

OTHER PUBLICATIONS

Bergh, et al., Electricity Theft Localization Based on Smart Metering, 21st International Conference on Electricity Distribution, Paper 1267, Frankfurt, Jun. 6-9, 2011, pp. 1-4.*

(Continued)

*Primary Examiner* — Wilbert L Starks
(74) *Attorney, Agent, or Firm* — Trentice V. Bolar

(57) ABSTRACT

Embodiments of the present invention provide a system, method, and computer program product to detect and localize non-technical losses in an energy distribution system. A computing device determines the energy consumption of a link and/or node that is associated with an energy grid. The computing device determines the mismatch between the determined energy consumption of the link and/or node and the predicted energy consumption of the link and/or node. The computing device also determines the location of unauthorized energy consumption within the energy that is associated with the mismatch.

9 Claims, 4 Drawing Sheets

(56) References Cited

FOREIGN PATENT DOCUMENTS

WO      2012037055 A1     3/2012

OTHER PUBLICATIONS

GOI, 2001, Blueprint for Power Sector Development, Ministry of Power Government of India, New Delhi, retrieved from http://powermin.nic.in/reports/pdf/ar01-02.pdf. (143 Pages).

Gregory, Mark, "India Struggles with Power Theft", BBC World Service International, Mar. 15, 2006, retrieved from: http://news.bbc.co.uk/2/hi/business/4802248.stm.

Lo et al., "Non-Technical Loss Detection Using Smart Distribution Network Measurement Data", Innovative Smart Grid Technologies, Asia (ISGT Asia), 2012, IEEE retrieved at: http://ieeexplore.ieee.org/stamp/stamp.jsp?tp=&arnumber=6303316.

Monedero et al., "Detection of Frauds and other Non-technical losses in a Power utility Using Pearson Coefficient, Bayesian Networks and Decision Trees", Electrical Power and Energy Systems 34, Spain, 2012, pp. 90-98 retrieved at: http://grupos.us.es/ustic150/wp-content/uploads/2011/12/epes_midas.pdf.

Nagi et al., "Nontechnical Loss Detection for Metered Customers in Power Utility Using Support Vector Machines", IEEE Transactions on Power Delivery, vol. 25, No. 2, Apr. 2010 retrieved at: http://ieeexplore.ieee.org/stamp.jsp?tp=&arnumber=5286297.

Power to Ontario. On Demand. (IESO), Monthly Market Report, Sep. 2006, retrieved from: http://www.ieso.ca/imoweb/pubs/marketReports/monthly/2006sep.pdf.

"The Power to Choose—Enhancing Demand Response in Liberalised Electricity Markets Findings of IEA Deman Response Project", Presentation 2003, France, retrieved from: http://www.schneider-electric.us/documents/solutions/demand-response-solutions/powertochoose_2003.pdf. (156 Pages).

Van Den Bergh et al., "Electricity Theft localization Based on Smart Metering", 21st International Conference on Electricity Distribution, CIRED, paper No. 1267, Frankfurt, Germany, Jun. 6-9, 2011 retrieved at: http://www.cired.net/publications/cired2011/part1/CIRED2011_1267_final.pdf.

* cited by examiner

NON-TECHNICAL LOSS DETECTION AND LOCALIZATION

BACKGROUND

The present disclosure relates generally to the field of electric power distribution systems, and more particularly to detecting and localizing non-technical loss in electric power distribution systems. Electric power distribution is the final stage in the delivery of electricity to energy consumers. A distribution system's network carries electricity from the transmission system and delivers it to energy consumers.

Electrical power grids are interconnected networks for delivering electricity from suppliers to consumers. They consist of generating stations that produce electrical power, high-voltage transmission lines that carry power from sources to demand centers, and distribution lines that connect individual customers. Smart grids are electrical power grids that use information and communications technology to gather and act on information, such as information about the behaviors and consumers, in an automated fashion to improve the efficiency, economics, and sustainability of the production and distribution of electricity. Smart grids may use smart meters, which are electrical meters that record consumption of electric energy and communicates that information for monitoring and billing. Smart meters can provide information of when energy was consumed at each metered site.

Non-technical losses (hereinafter "NTL") are commercial losses that can not be attributed to energy being lost through the network of internal consumption. NTL may occur due to unnoticed high impedance fault, meter fault or electricity theft in the form of fraud, theft, billing irregularities and unpaid energy bills. NTL affects developing as well as developed nations. For example, estimated NTL in Mexico is 10-20%, South America 10-16%, India 20-40%, and in the United States NTL is estimated to be about 0.5-3.5%.

SUMMARY

Embodiments of the present invention provide a system, method, and computer program product to detect and localize non-technical losses in an energy distribution system. A computing device determines the energy consumption of a link and/or node that is associated with an energy grid. The computing device determines the mismatch between the determined energy consumption of the link and/or node and the predicted energy consumption of the link and/or node. The computing device also determines the location of unauthorized energy consumption within the energy that is associated with the mismatch.

DETAILED DESCRIPTION

Figure 1:
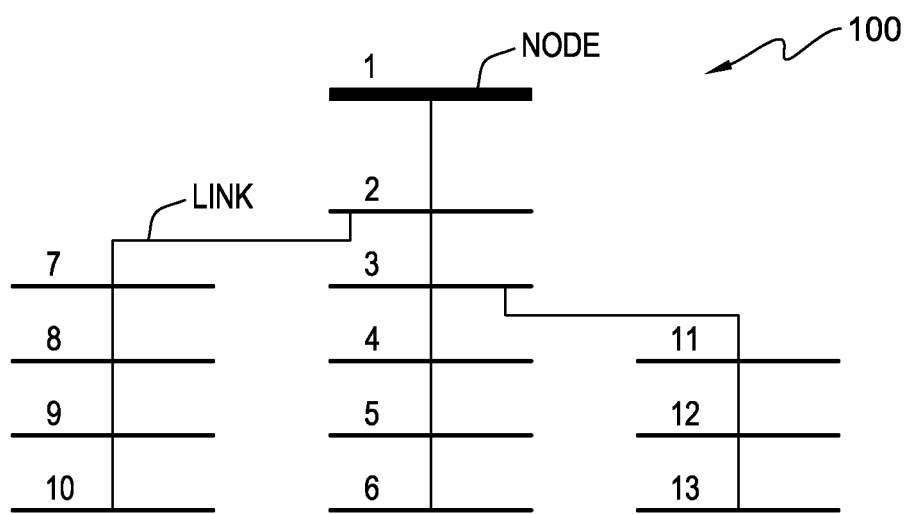
FIG. 1 depicts an energy distribution grid, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Electric power distribution is the final stage in the delivery of electricity to energy consumers. A distribution system's network carries electricity from the transmission system and delivers it to energy consumers. Electricity is distributed over an electrical grid (hereinafter "grid") and connects distributors to energy consumers (hereinafter "consumers"). Grids consist of generating stations that produce electrical power, high-voltage transmission lines that carry power from distant sources to substations wherein the voltage is stepped-down, for example, to 25 kW or less, for power distribution to consumers, and distribution lines that connect substations to individual consumers.

Contemporary grids often utilize supervisory control and data acquisition (hereinafter "SCADA") industrial control systems that monitors and controls electrical power transmission. Such systems generate power and voltage transmission data. Digital electrical meters (hereinafter "smart meter"), which monitor power and voltage consumption, may also be utilized in some contemporary grids. Often, the estimated amount of energy transmitted to a grid does not equate to the estimated amount of energy consumed from the grid. Non-technical losses (hereinafter "NTL") are commercial losses that can not be attributed to energy being lost through the network or internal consumption.

NTL may occur due to unnoticed high impedance faults, meter fault or electricity theft in the form of fraud (i.e. meter tampering), purloining of energy (i.e. illegal connections), billing irregularities and unpaid bills. An object of the present invention is utilize SCADA data at the main substation (i.e. root node), smart meter data at consumer nodes, and network connectivity information to detect and localize NTL for a given grid. Briefly, to detect theft, estimated power supplied at the root node is compared with the actual power supplied (as measured by the SCADA system). In case of a significant mismatch, theft is detected and the mismatch amount is treated as NTL.

Once the theft is detected, the node or location of the theft is identified using the smart meter data. Assuming that the majority of energy distribution systems are radial, voltage at any downward node dips gradually when power from the source to the load. This voltage dip is a function of distribution feeder properties, such as resistance, reactance, ect., and load/current on the feeder. As line property does not change over time, voltage dip can be function of the quantity of load experienced on the line. Hence, voltage dip can be a good indicator of amount of power flowing in the feeder.

In case of theft, extra power flows though the feeder and/or feeders, which can cause unexpected voltage dips near the theft premises, which may be identified by comparing the estimated voltage and smart meter measured voltage at the nodes. Nodes having significant voltage mismatches are identified as suspected locations of theft. To identify the theft amount, total theft amount is distributed at the suspected nodes based on the ratio of their voltage dip and further adjusted in such a way that estimated voltage and measured voltage at each node are minimized. Embodiments of the present invention will now be described in detail with reference to the Figures.

FIG. 1 depicts an exemplary energy distribution grid, in accordance with an embodiment of the present invention. Specifically, FIG. 1 depicts an energy distribution grid, generally 100, having thirteen (13) nodes that are interconnected by twelve (12) links. In an embodiment, node 1 is a power generating station or a substation. Node 2 transfers power from node 1 to nodes 3 through 10. Node 3 transfers power to nodes 11 through 13. In an embodiment, Nodes 2 through 13 include one or more energy consumers whose consumption is monitored and reported by an electronic meter, such as electronic meter 210 (discussed below). The voltage that flows through nodes 3 through 13 is at a level that is appropriate for consumption. In an embodiment, energy distribution energy distribution grid 100 is a smart grid, which is an electrical grid that uses information and communication technology to gather and act on information in an automated fashion to improve the efficiency, reliability, economics, and sustainability of the production and distribution of electricity. The links that are included in energy distribution grid 100 may be a mix of overhead line construction utilizing traditional utility poles and wires as well as underground construction with cables and indoor or cabinet substations.

Figure 2:
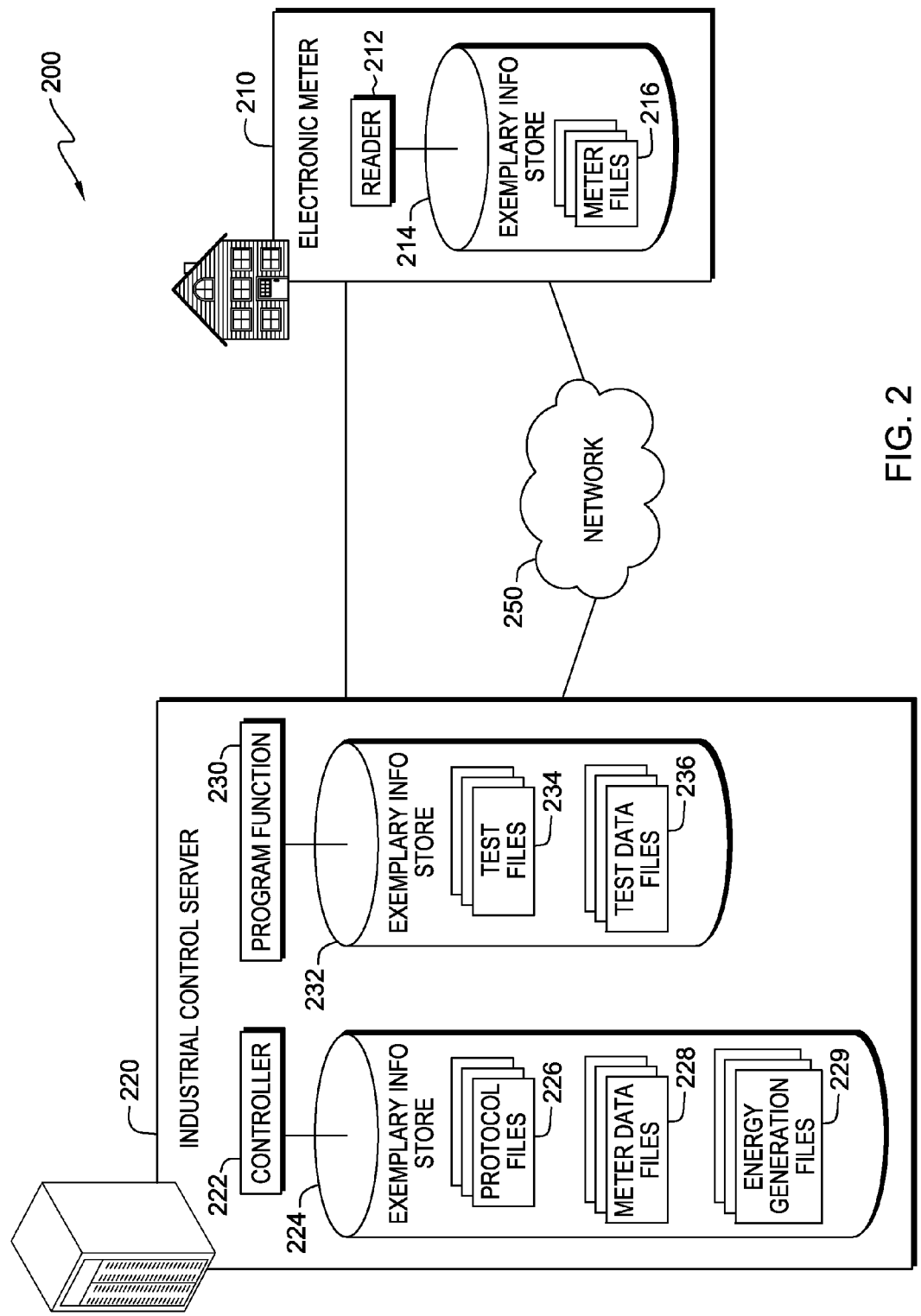
FIG. 2 is block diagram illustrating an environment, in accordance with an embodiment of the present invention.

NTL are commercial losses that are not attributed to energy being lost through the network of internal consumption. NTL occurs due to unnoticed high impedance faults, meter fault, or electricity theft in the form of fraud, such as meter tampering, theft, such as unauthorized connections, billing irregularities, and unpaid utility bills. In general, system designer have partial information about the possible location and quantities of these losses due to system knowledge, external measurements, and/or historical data. FIG. 2 is a block diagram illustrating an environment, generally designated 200, in accordance with one embodiment of the present invention. Environment 200 is an environment wherein energy consumption is quantified, reported, and analyzed for NTL events.

Environment 200 includes electronic meter 210 and industrial control server 220 interconnected via network 250, in accordance with an embodiment of the present invention. Network 250 can be, for example, a local area network (LAN), a wide area network (WAN) such as the Internet, or a combination of the two, and can include wired, wireless, or fiber optic connections. In general, network 250 can be any combination of connections and protocols that will support communications between electronic meter 210 and industrial control server 220. In various embodiments of the present invention, electronic meter 210 and industrial control server 220 may be a laptop computer, tablet computer, netbook computer, personal computer (PC), a desktop computer, a personal digital assistant (PDA), or a smart phone.

Electronic meter 210 is a computing device that records and communicates energy consumption for monitoring and billing purposes. The energy consumption of each energy consumer associated with energy distribution grid 100 is recorded and communicated by electronic meters. In an embodiment, electronic meter 210 is a smart meter. Electronic meter 210 includes reader 212 and exemplary information store 214. Electronic meter 210 communicates with industrial control server 220 using an appropriate protocol, such as ANSI C12.18, IEC 61107, IEC 62056, and TCP/IP-based technology. Electronic meter 210 measures energy consumption, such as power, voltage, and harmonic distortions. In general, electronic meter 210 is any computing device can record and communicate energy consumption. Exemplary information store 214 is in communication with reader 212, in accordance with an embodiment of the present invention. Exemplary information store 214 is an information repository that includes meter files 216, which include voltage and/or harmonic distortion measurements generated by reader 212 (discussed below).

Reader 212 is in communication with exemplary information store 214, in accordance with an embodiment of the present invention. Reader 212 can be software that records and communicates energy consumption. Reader 212 measures the quantity of energy consumed at a node, such as node 13 of FIG. 1, by an energy consumer associated with energy distribution grid 100. Reader 212 records energy consumption measurements in meter files 216. Industrial control server 220 is in communication with electronic meter 210, via network 250. Industrial control server 220 is a computing device that monitors, controls, and/or analyzes energy consumption in an energy grid, such as energy distribution grid 100, in accordance with an embodiment of the present invention.

In another embodiment, industrial control server 220 is a supervisory control and data acquisition server. Industrial control server 220 includes exemplary information store 224, controller 222, exemplary information store 232, and program function 230. Exemplary information store 224 is an information repository that includes energy generation files 229, meter data files 228, and protocol files 226. Energy generation files 229 are files that include information reflective of the quantity of energy supplied to the energy consumer that is associated with a particular node, such as the energy consumer that is associated with electronic meter 210. In other embodiments, energy generation files 229 are included in another information repository that is in communication with network 250.

In another embodiment, energy generation files 229 include a series of value-timestamp pairs wherein value is the energy output value that is being monitored and the timestamp is the time and/or date that energy output value was recorded. In yet another embodiment, energy generation files 229 include information reflective of the network connectivity of energy distribution grid 100 of FIG. 1. In other embodiments, energy generation files 229 include link parameter data that includes associated resistance, reactance, and capacitance information. Meter data files 228 are included in exemplary information store 224. Meter data files 228 include meter data, such as the meter data generated by reader 212 that is received from an electronic meter, such as electronic meter 210, via network 250.

Protocol files 226 are included in exemplary information store 224. Protocol files 226 include instructions for controlling the energy supplied to an energy consumer, such as the energy consumers associated with energy distribution grid 100 of FIG. 1. Controller 222 is included in industrial control server 230 and is in communication with exemplary information store 224 and program function 230. In this example, controller 222 is software that controls and/or monitors energy consumption within energy distribution grid 100, in accordance with an embodiment of the present invention. Controller 222 can be software that controls and/or monitors energy consumption that is associated with electronic meter 210.

In an embodiment, controller 222 and electronic meter 210 communicate using an appropriate communications protocol, such as Modbus RTU, RP-570, Profibus, Conitel, IEC 60870-5-101, IEC 60870-5-104, IEC 61850, and DNP3. Controller 222 receives instructions from program function 230. Test data files 236 are included in exemplary information store 232, in accordance with an embodiment of the present invention. Test data files 236 are files that include test results associated with energy distribution grid 100, such as test results generated by program function 230. In an embodiment, test data files 236 include information reflective of the voltage at nodes included in energy distribution grid 100, power flow on links included in energy distribution grid 100, power loss in each link, and/or cumulative network loss. In another embodiment, the test results included in test data files 236 include information reflective of the magnitude and phase angle of the voltage at each bus, and the real and reactive power flowing in each line.

Test files 234 include tests that determine the energy consumption at nodes included in energy distribution grid 100, power flow on links included in energy distribution grid 100, power loss in a particular link, and/or cumulative network loss. Test files 234 also include tests that determine the magnitude and phase angle of the voltage at each bus, and the real and reactive power flowing in each line. In an embodiment, test files 234 include power flow methods that solve power flow equations known to those skilled in that art, such as the Fast Decouple Load Flow, Newton Raphson Load Flow, and/or Gauss-Seidel method.

Program function 230 is in communication with controller 222 and exemplary information store 232, in accordance with an embodiment of the present invention. Program function 230 can be software that determines sources of non-technical loss (hereinafter "NTL") in an energy grid. Program function 230 can transmit instructions to controller 222 for execution. Program function 230 generates test data files 236. Program function 230 solves power flow equations (discussed above) using information power flow methods included in test files 234. Program function 230 determines the voltage at nodes included in energy distribution grid 100, power flow on links included in energy distribution grid 100, power loss in each link, and/or cumulative network loss. Program function 230 also determines the magnitude and phase angle of the voltage at each bus, and the real and reactive power flowing in each line included in energy distribution grid 100.

Figure 3:
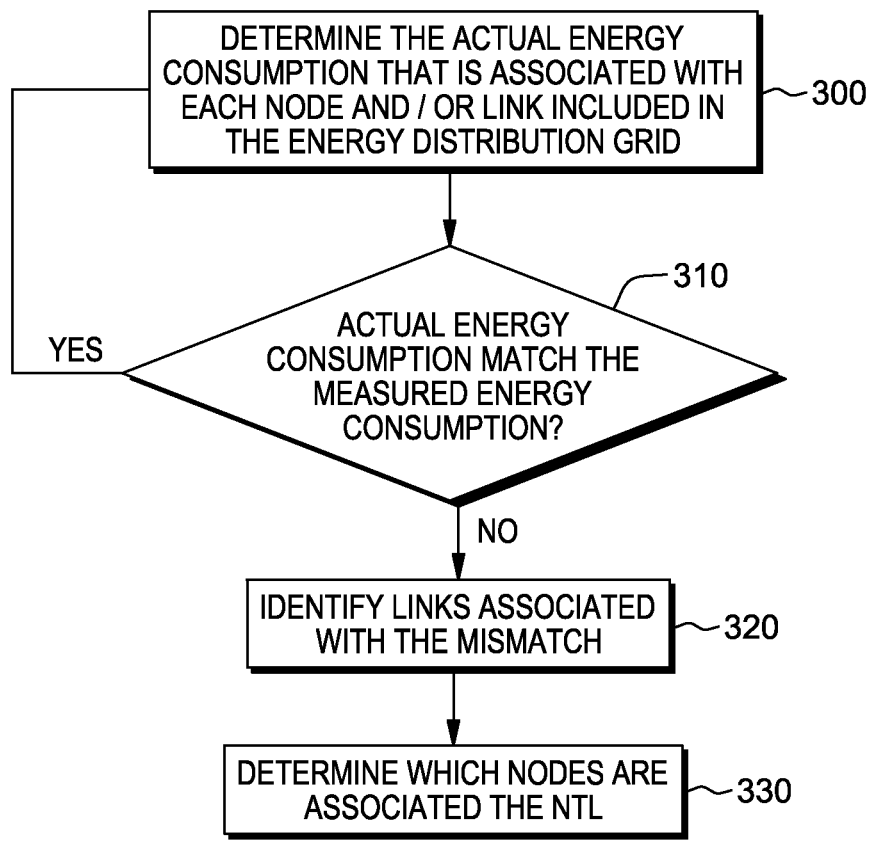
FIG. 3 illustrates operational steps of a program function, in accordance with an embodiment of the present invention.

NTL may be determined when measurements are available at both the distribution transformer and customer end as well as when measurements are only available at the substation and consumer ends. FIG. 3 illustrates the operational steps of program function 230, in accordance with an embodiment of the present invention. To begin, program function 230 determines the actual energy consumption that is associated with each node and/or link that is included in the energy distribution grid 100 (step 300).

For example, program function 230 determines the power flow that is associated with nodes 1-13 by utilizing information included in energy generation files 229 and the power flow method included in test files 234. If energy consumption measurements are available from transformers and smart meters that are associated with energy distribution grid 100, program function 230 determines link power flow, as reflected in Table 1 (discussed below). If energy consumption measurements are only available at the substation and smart meters, program function 230 calculates the voltage consumption at each node included in energy distribution grid 100 (discussed below in Table 2). Program function 230 determines whether the determined actual energy consumption matches the measured energy consumption value (step 310). For example, for each node, program function 230 compares the determined power flow from step 300 to the appropriate meter data that is included in meter data files 228. If program function 230 determines that the determined power flow matches the measured power flow ("yes" branch decisional 310), then program function 230 returns to step 300. In an embodiment, if program function 230 determines that the determined power flow matches the measured power flow, then program function generates a notification of the determination.

If program function 230 determines that the determined energy consumption does not match the measured energy consumption ("no" branch decisional 310), program function 230 identifies which links are associated with NTL (step "320"). For example, program function 230 identifies which links are associated with NTL by utilizing equations [1].

$$\text{Min} \sum_{i=1}^{nbus} (V_i^{Measured} - V_i^{Calculated}) \quad [1]$$

$$\text{s.t.} \sum_{k=1}^{nbus} E_k^{Theft} = \sum_{j=1}^{nfeeder} (E_j^{Measured} - E_j^{Calculated})$$

wherein V is voltage, i is the link or node, and E is power. Briefly, if theft is occurring at a certain location, it would change the voltages, currents, and powers calculated as per the optimal power flow process. Using equations [1], mismatches between measured and calculated voltage at each node determine the nodes that are associated with NTL. For each node, load mismatches are fitted among nodes such that (s.t.) the cumulative sum of differences between measured and calculated voltage is minimized. As such, nodes with high load differences may be deemed as locations of theft/pilferage.

In situations where energy consumption measurements are available at both the transformers and smart meters, program function 230 generates a table, for example Table 1, using the measurements and minimizing equations [1],

TABLE 1

| Line | From | To | Calculated Power Flow | Measured Power Flow | NTL |
|---|---|---|---|---|---|
| 1 | 1 | 2 | 1.73917 | 2.61749 | 0.87832 |
| 2 | 2 | 3 | 1.27588 | 2.15147 | 0.8756 |
| 3 | 3 | 4 | 0.24023 | 0.24024 | 0 |
| 4 | 4 | 5 | 0.12006 | 0.12006 | 0 |

TABLE 1-continued

| Line | From | To | Calculated Power Flow | Measured Power Flow | NTL |
|---|---|---|---|---|---|
| 5 | 5 | 6 | 0.06002 | 0.06002 | 0 |
| 6 | 2 | 7 | 0.36113 | 0.36114 | 0 |
| 7 | 7 | 8 | 0.27097 | 0.27097 | 0 |
| 8 | 8 | 9 | 0.18014 | 0.18014 | 0 |
| 9 | 9 | 10 | 0.09004 | 0.09004 | 0 |
| 10 | 3 | 11 | 0.9394 | 1.80351 | 0.86411 |
| 11 | 11 | 12 | 0.84629 | 1.70197 | 0.85568 |
| 12 | 12 | 13 | 0.42126 | 0.4213 | 0.00004 |

For example, program function 230 utilizes equations [1] and determines the differences between calculated and measured power flow, which reflect NTL issues associated with links 1, 2, 10 and 11. Line 1 has a calculated power flow of 1.73917 MW whereas measured power flow is 2.61749 MW. Hence, NTL is 0.87832 MW. In other embodiments, theft amount may also be determined. For example, power lines have an impedance, Z, which quantifies how much current passes through the power lines when a certain voltage is applied across the power lines. The power factor of a load quantifies how much real power it draws as opposed to reactive power. Although, total power is the summation of real and active power, only real power works. For an impedance, such as 0.1, some amount of power is lost to heat (hereinafter "technical loss") as opposed to NTL. Hence, given a NTL measurement, such as 0.87832 MW, impedance, such as 0.1, and power factor, such as 0.04, technical losses can be determined by solving for optimal power flow, 0.04 MW. Hence, theft amount is 0.83 MW (0.87 MW-0.04 MW).

In situations where energy consumption measurements are only available at the substation and smart meters, program function 230 generates a table, for example Table 2, using equations [1],

TABLE 2

| Node | Calculated Voltage | Measured Voltage | Mismatch |
|---|---|---|---|
| 1 | 1 | 1 | 0 |
| 2 | 0.9987 | 0.9981 | 0.0006 |
| 3 | 0.9938 | 0.9898 | 0.004 |
| 4 | 0.9931 | 0.9891 | 0.004 |
| 5 | 0.9928 | 0.9888 | 0.004 |
| 6 | 0.9924 | 0.9884 | 0.004 |
| 7 | 0.9982 | 0.9976 | 0.0006 |
| 8 | 0.9947 | 0.994 | 0.0007 |
| 9 | 0.9939 | 0.9933 | 0.0006 |
| 10 | 0.9933 | 0.9927 | 0.0006 |
| 11 | 0.9903 | 0.983 | 0.0073 |
| 12 | 0.9837 | 0.9696 | 0.0141 |
| 13 | 0.9804 | 0.9663 | 0.0141 |

For example, program function 230 utilizes equation 1 and determines the differences between calculated and measured voltage consumption, which reflects significant mismatches associated with nodes 12 and 13.

Program function 230 determines which nodes are associated with NTL and the amount thereof (step 330). For example, to determine NTL locations, program function 230 fits the determined differences among nodes 1-13 such that the cumulative sum of the differences measured and calculated values in minimized. Nodes with high differences are determined to be the locations of unauthorized energy consumption.

Minimization of equation 1 can be accomplished using one of several algorithms. First, minimization can be accomplished by discretizing loads at the level of one unit and change loads over at nodes each time running the power-flow algorithm and choose the load solution that minimizes the difference between measured and actual voltages. Minimization can also be accomplished using a stochastic method wherein the optimization algorithms draws a number of samples or scenarios randomly and minimizes the objective function. In one embodiment, we can then replace the expectation in the optimization above with a summation over these scenarios and choose the x sequence that minimizes the summation.

Using the above, program function 230 determines that node 12 of Table 1 is associated with unauthorized energy consumption that measures, for example, 0.83 MW and 0.39 MVAR. Likewise, program function 230 determines that node 12 of Table 2 is associated with unauthorized energy consumption that measures, for example, 0.827 MW.

Figure 4:
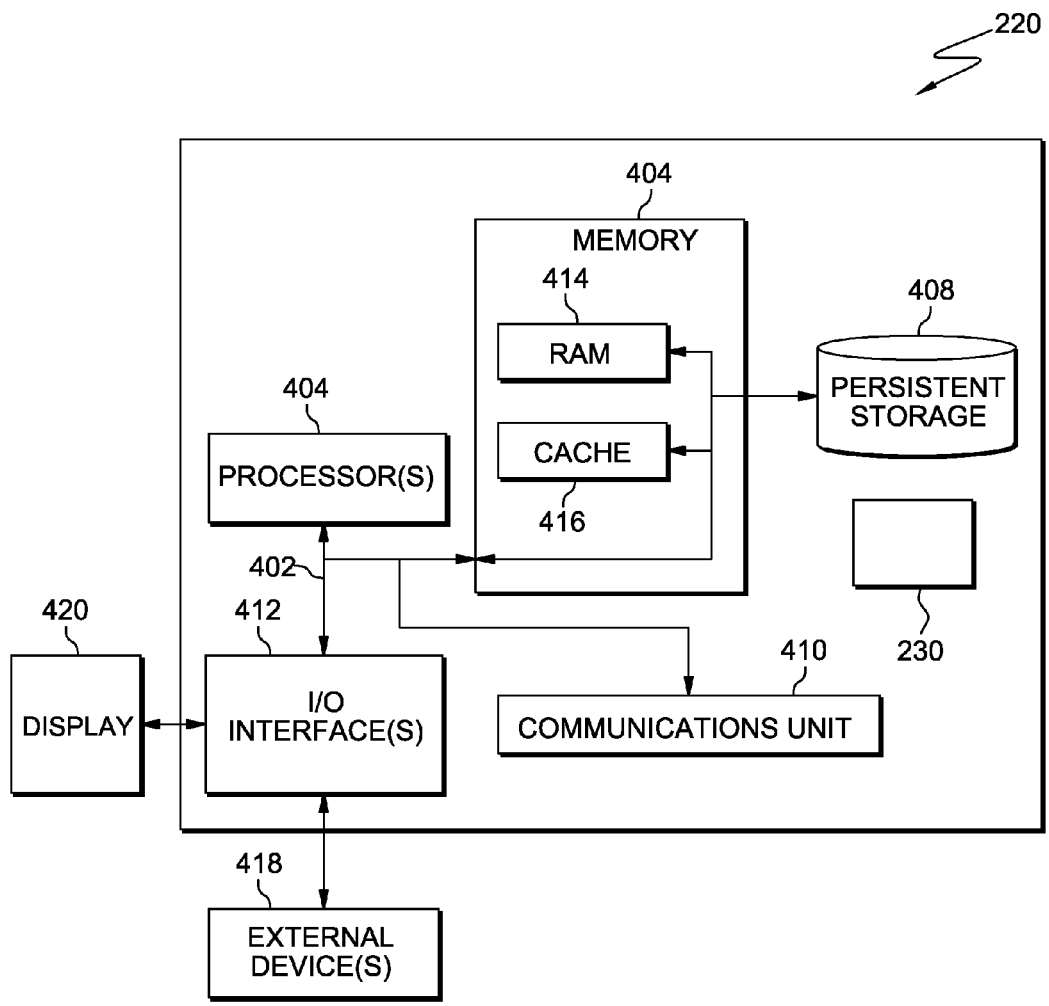
FIG. 4 depicts a block diagram of components of the industrial control server, in accordance with an embodiment of the present invention.

FIG. 4 depicts a block diagram of components of industrial control server 220, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Industrial control server 220 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Controller 222, program function 230, and exemplary stores 224 and 232 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including electronic meter 210. In these examples, communications unit 410 includes one or more network interface cards. Communications unit 410 may provide communications through the use of either or both physical and wireless communications links. Controller 222 and program function 230 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., controller 222 and program function 230, can be stored on such portable computer-readable storage media and can be loaded onto persistent storage 408 via I/O interface(s) 412. I/O interface(s) 412 also connects to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:

estimating, by a supervisory control and data acquisition (SCADA) system located at a rood node, an estimated electrical energy consumption value for a predetermined time interval;

measuring, by the SCADA system, an actual electrical energy consumption value corresponding to electrical energy supplied by the root node of a grid during the predetermined time interval;

determining, by a computing device, that a mismatch between the estimated electrical energy consumption value and the actual electrical energy consumption value exceeds a technical loss threshold such that non-technical losses were experienced by the grid during the predetermined time interval;

receiving, from a plurality of smart meters respectively located at a plurality of energy consumption nodes, over a communication network and by the computing device, a plurality of voltage values collected during the predetermined time interval, with the plurality of voltage values indicating voltage levels experienced at the respectively corresponding smart meters; and responsive to the determination that non-technical losses were experienced by the grid, determining, by the computing device, a location the non-technical losses based on the voltage values collected from the plurality of smart meters.

2. The method of claim 1, wherein the determination of the location of the non-technical losses includes determining a voltage dip at a set of smart meter(s) and associated energy consumption node(s).

3. The method of claim 1, wherein the non-technical losses are caused by theft and/or fraud.

4. A computer program product comprising:
a computer readable storage device; and
computer code stored on the machine readable storage device, with the computer code including instructions for causing a processor(s) set to perform operations including the following:
estimating, by a supervisory control and data acquisition (SCADA) system located at a rood node, an estimated electrical energy consumption value for a predetermined time interval,
measuring, by the SCADA system, an actual electrical energy consumption value corresponding to electrical energy supplied by the root node of a grid during the predetermined time interval,
determining, by a computing device, that a mismatch between the estimated electrical energy consumption value and the actual electrical energy consumption value exceeds a technical loss threshold such that non-technical losses were experienced by the grid during the predetermined time interval,
receiving, from a plurality of smart meters respectively located at a plurality of energy consumption nodes, over a communication network and by the computing device, a plurality of voltage values collected during the predetermined time interval, with the plurality of voltage values indicating voltage levels experienced at the respectively corresponding smart meters, and
responsive to the determination that non-technical losses were experienced by the grid, determining, by the computing device, a location the non-technical losses based on the voltage values collected from the plurality of smart meters.

5. The computer program product of claim 4, wherein the determination of the location of the non-technical losses includes determining a voltage dip at a set of smart meter(s) and associated energy consumption node(s).

6. The computer program product of claim 4, wherein the non-technical losses are caused by theft and/or fraud.

7. A computer system comprising:
a processor(s) set;
a computer readable storage device; and
computer code stored on the machine readable storage device, with the computer code including instructions for causing a processor(s) set to perform operations including the following:
estimating, by a supervisory control and data acquisition (SCADA) system located at a rood node, an estimated electrical energy consumption value for a predetermined time interval,
measuring, by the SCADA system, an actual electrical energy consumption value corresponding to electrical energy supplied by the root node of a grid during the predetermined time interval,
determining, by a computing device, that a mismatch between the estimated electrical energy consumption value and the actual electrical energy consumption value exceeds a technical loss threshold such that non-technical losses were experienced by the grid during the predetermined time interval,
receiving, from a plurality of smart meters respectively located at a plurality of energy consumption nodes, over a communication network and by the computing device, a plurality of voltage values collected during the predetermined time interval, with the plurality of voltage values indicating voltage levels experienced at the respectively corresponding smart meters, and
responsive to the determination that non-technical losses were experienced by the grid, determining, by the computing device, a location the non-technical losses based on the voltage values collected from the plurality of smart meters.

8. The computer system of claim 7, wherein the determination of the location of the non-technical losses includes determining a voltage dip at a set of smart meter(s) and associated energy consumption node(s).

9. The computer system of claim 7, wherein the non-technical losses are caused by theft and/or fraud.

* * * * *

UNITED STATES PATENT AND TRADEMARK OFFICE
CERTIFICATE OF CORRECTION

PATENT NO. : 9,536,198 B2
APPLICATION NO. : 14/087788
DATED : January 3, 2017
INVENTOR(S) : Arya et al.

Page 1 of 1

It is certified that error appears in the above-identified patent and that said Letters Patent is hereby corrected as shown below:

On the Title Page

Item (72), the 6th Inventor should be corrected to read:
-Devasenapathi P. Seetharamakrishnan-.

Signed and Sealed this
Fourteenth Day of April, 2020

Andrei Iancu
*Director of the United States Patent and Trademark Office*